United States Patent
Maust et al.

(10) Patent No.: US 10,149,424 B2
(45) Date of Patent: Dec. 11, 2018

(54) AUTOMATED ELECTRONIC PRECISION PLANTING SYSTEM

(71) Applicant: Steering Solutions IP Holding Corporation, Saginaw, MI (US)

(72) Inventors: Brian G. Maust, Unionville, MI (US); Christopher R. Douglas, Saginaw, MI (US); Addney T. Biery, Clio, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 15/409,144

(22) Filed: Jan. 18, 2017

(65) Prior Publication Data

US 2017/0202132 A1 Jul. 20, 2017

Related U.S. Application Data

(60) Provisional application No. 62/280,553, filed on Jan. 19, 2016.

(51) Int. Cl.
| | | |
|---|---|---|
| *A01C 5/06* | (2006.01) | |
| *G05B 11/01* | (2006.01) | |
| *A01C 7/20* | (2006.01) | |
| *A01C 21/00* | (2006.01) | |

(52) U.S. Cl.
CPC .............. *A01C 5/06* (2013.01); *A01C 7/203* (2013.01); *A01C 21/00* (2013.01); *G05B 11/01* (2013.01)

(58) Field of Classification Search
CPC .................... A01C 5/06; G05B 11/01
See application file for complete search history.

(56) References Cited

U.S. PATENT DOCUMENTS

| | | | | |
|---|---|---|---|---|
| 9,271,439 B2* | 3/2016 | Bourgault | ............ | A01C 21/005 |
| 9,788,156 B1* | 10/2017 | Anderson | ............ | H04W 4/021 |
| 2006/0048800 A1* | 3/2006 | Rast | ............ | A47L 1/02 134/56 R |
| 2006/0220826 A1* | 10/2006 | Rast | ............ | B60Q 1/44 340/479 |
| 2007/0125155 A1* | 6/2007 | Barreiro | ............ | A01G 7/06 73/37 |
| 2014/0277963 A1* | 9/2014 | Van Mill | ............ | A01D 41/127 701/50 |

(Continued)

FOREIGN PATENT DOCUMENTS

| | | |
|---|---|---|
| DE | 202014101488 U1 | 7/2014 |
| DE | 102016107979 A1 | 11/2016 |
| WO | 9304434 A1 | 3/1993 |

OTHER PUBLICATIONS

Office Action regarding related DE Application No. 102017100939.6 dated Dec. 21, 2017, with English Translation; 10 pages.

*Primary Examiner* — Aaron L Troost
*Assistant Examiner* — Martin A Weeks
(74) *Attorney, Agent, or Firm* — Cantor Colburn LLP

(57) ABSTRACT

A seed planter adjustment system includes at least one component of a seed planter that is adjustable for controlling a seed planting depth. Also included is a controller in operative communication with the at least one component. Further included is a user interface in electronic communication with the controller, the user interface receiving an adjustment command from an operator to remotely adjust the at least one component.

21 Claims, 1 Drawing Sheet

(56) References Cited

U.S. PATENT DOCUMENTS

2016/0100517 A1* 4/2016 Bassett ................ A01B 61/044
                                                                                       172/1
2017/0150679 A1* 6/2017 Van Mill .............. A01D 41/127

* cited by examiner

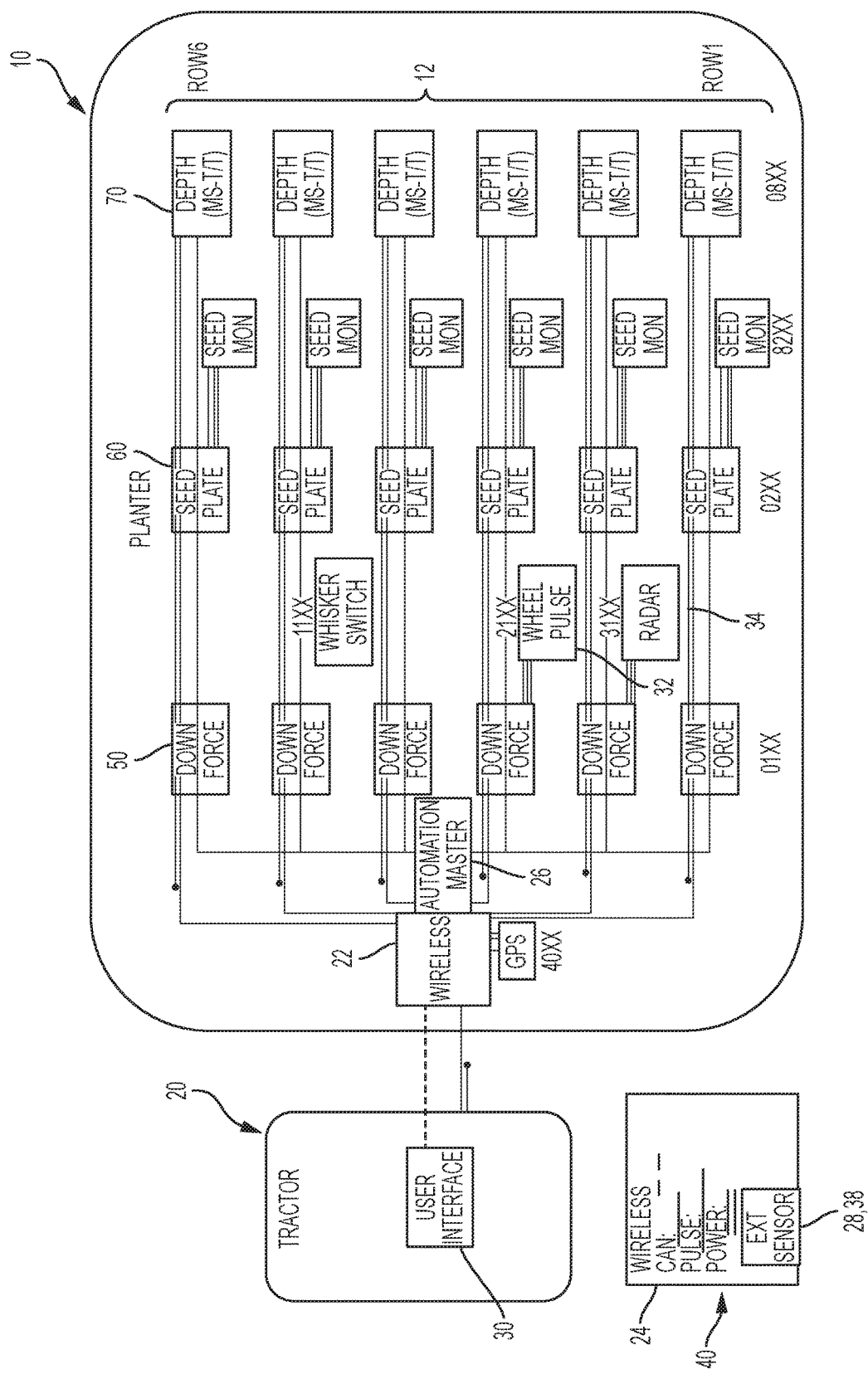

AUTOMATED ELECTRONIC PRECISION PLANTING SYSTEM

CROSS-REFERENCE TO RELATED APPLICATION

This patent application claims priority to U.S. Provisional Patent Application Ser. No. 62/280,553, filed Jan. 19, 2016, which is incorporated herein by reference in its entirety.

BACKGROUND OF THE INVENTION

The embodiments described herein relate to a seed planter and, more particularly, to a user interface for a control system for real-time monitoring and controlling seed depth placement during operation of the seed planter.

Conventional planting implements currently used in no-till farming, commonly referred to as "planters" utilize a seed channel opener, typically in the form of a disc, that creates a channel or furrow in the soil for seed placement. No-till planting involves planting the seeds into untilled ground. Because the ground is untilled, the field has greater variances in soil conditions. In other words, the untilled field has non-uniform field conditions. In general, three types of soil conditions are observed. First, under moist soil conditions, the seed bed can become compacted by excessive down pressure. Second, under hard, dry and/or compacted soil conditions, insufficient down pressure can result in a seed channel of inadequate depth or a seed channel simply not formed, resulting in seed placement on the soil surface. Third, in soft soil conditions, the seed channel can be cut too deeply by excessive down pressure, resulting in seed placement which is too deep.

Prior efforts at controlling seed depth rely on a specified down force load/pressure exerted on a planter row unit, or bank of units. An assumption of seed depth is made based on the specified load/pressure. However, as described above, the soil conditions vary and therefore the planted seed depth is varied under a specified load/pressure.

Negative consequences may result from soil variance. Consider the farmer who initially sets the down pressure of the planting implement to accommodate the average soil conditions in his field. When hard soil conditions are encountered, the down pressure exerted on the seed opener is not sufficient to create the seed channel. Thus, the seed is placed on top of the ground, thereby lowering crop yields. When wet or soft soil conditions are encountered, the down pressure exerted on the seed opener is excessive. In wetter soil, this excessive pressure will cause compacting on either side of the seed channel and can cause accumulation and pushing of mud. In softer soil, this excessive pressure can cause the seed channel to be cut too deep. These conditions also lower the crop yields. Finally, the excessive down pressure in both wet soil and soft soil conditions is an unnecessary burden to both the tractor pulling the planter and the depth control wheel bearing of the planter.

Despite prior attempts to develop a planting implement capable of providing a constant depth of soil penetration, a need still exists for a planting implement and control system for providing real time control of a depth control device which can accurately and precisely control the depth of a seed channel being cut.

SUMMARY OF THE INVENTION

In accordance with one aspect of the invention, a seed planter adjustment system includes at least one component of a seed planter that is adjustable for controlling a seed planting depth. Also included is a controller in operative communication with the at least one component. Further included is a user interface in electronic communication with the controller, the user interface receiving an adjustment command from an operator to remotely adjust the at least one component.

In accordance with another aspect of the invention, a seed planter adjustment system includes a seed planter. The seed planter includes at least one actuator for controlling automated seed planting depth. Also included is a controller for autonomous control of the at least one actuator. Further included is a gateway, via a wireless interface, for sending sensed input signals to a user interface and for receiving commands to the controller, the actuator being operatively adjustable.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 1 schematically illustrates an embodiment of a seed planter described herein.

DETAILED DESCRIPTION

Referring now to the FIG. 1, where the invention will be described with reference to specific embodiments, without limiting same, an automated electronic precision planting system is shown.

Rather than requiring manual adjustment of individual elements of a modular row design for a planter 10 (e.g., hydraulically), the planter control system, as described herein, provides an operator the advantages of an automated adjustment system. As shown, the planter 10 includes a plurality of row units 12 that each individually plant seeds or other agricultural products. Although six rows are illustrated, it is to be appreciated that more or less rows may be included. The depth of planting of the seeds and/or products impacts the farming yield and efficiency. Therefore, adjusting the planting depth based on the soil conditions is often necessary. This may be done by adjusting the downforce applied with each row unit, for example.

The system described herein allows an operator to remotely adjust the row units 12. In some embodiments, a signal is sent in a wired manner to one or more elements of the planter 10 to adjust the row units 12. In other embodiments, a signal is sent wirelessly to one or more elements to adjust the row units 12. Irrespective of whether the signal is sent in a wired or wireless manner, a user interface 30 that is in operative communication with the planter 10 allows a user to remotely adjust elements of the planter 10 to control planting depth of the row units 12. In some embodiments the user interface 30 includes a controller integrated therein. In other embodiments, the controller is in operative communication with the user interface 30 and the row units 12 and is disposed at an intermediate location.

In the embodiment shown, the user interface 30 is located onboard a tractor 20. The user interface 30 may include a touch screen, buttons or other interactive components that allows the operator to input commands. In some embodiments, the user interface 30 is permanently fixed to the tractor 20. In other embodiments, the user interface 30 is a mobile device, such as a tablet, laptop, phone, smart watch, etc., that an operator may interact with. It is contemplated that a non-permanently fixed device, such as a mobile device, may be physically connected to the tractor 20 to establish a wired electrical connection to the planter 10.

Regardless of the specific type of user interface employed, the operator may adjust each of the modular row design elements for each respective individual row unit at the same time and consistently. Each row unit will have the same loads exerted based on the similar signal being sent to each unit. In another embodiment, different rows may be adjusted differently than adjacent rows. The individual rows may have a distinct signal being sent to different rows to affect the respective rows. In this way, adjacent rows may be adjusted differently.

Disclosed is an electronic communication between the planter 10 and the tractor 20. In the case of wireless communication, the communication may be provided by any wireless technique available. In an embodiment, the wireless technique is a Bluetooth connection, schematically represented with element 22, utilizing any one of an Android, Apple, or any other input device having a human interface, as described above, with Bluetooth enabled technology. Other components of a wireless system 40 include a wireless gateway to a controller area network (CAN) bus 24, an automation master control 26, and ground speed sensors 28 that include GPS 38 in some embodiments. The wireless gateway to a CAN 24 bus utilizes a bi-directional gateway between planter 10, the user interface 30. A CAN 2.0 B 500 k band network may be employed in some embodiments.

The automation master control 26 is a stand-alone automation master that does not rely on user interaction after setup is complete in some embodiments. The ground speed sensors 28 include GPS 38, wheel speed 32, radar 34, or combinations of each to determine ground speed.

In one embodiment the modular row design, as illustrated in individual rows 1-6, utilizes an automated down force actuator 50 having a brushless motor driving ball screw via a worm gear. A PID controller calculates position and provides error reduction via a control algorithm. In the illustrated embodiment, each individual row unit 12 also includes an electronic driven seed plate 60. Seed plate 60 utilizes a brushless motor driving seed plate via a worm gear speed reducer. A PID controller position based velocity error reduction is provided via a control algorithm. Optic seed sensors are monitored directly by the controller of the seed plate 60. The seed plate controller includes advanced features of seed plate preload, and skip/doubles calculations. In one embodiment it also includes distributed calculation power.

In the embodiment shown, each individual row unit 12 of the planter 10 includes remote electronic seed depth control 70. Remote electronic seed depth control includes a brushed motor driven by a FET H-bridge controller with encoder position feedback. Other features include Binary speed control, and Tertiary direction control algorithm.

The above-described sensors and components detect a number of conditions that affect seed planting depth at given downforce actuator settings. The detected conditions are sent to the controller and/or user interface 30 and processed to determine if an adjustment is required. Detection may be performed continuously in a nearly instantaneous manner or may occur at spaced intervals.

Advantageously, an operator may remotely adjust components of the planter 10 to control planting depth, thereby eliminating the need to manually do so. Additionally, each row may be controlled to account for soil characteristic variation to optimize planting depth of all seeds and/or agricultural products.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A seed planter adjustment system comprising:
   at least one component of a seed planter that is adjustable for controlling a seed planting depth;
   a controller in operative communication with the at least one component;
   a user interface in electronic communication with the controller, the user interface receiving an adjustment command from an operator to remotely adjust the at least one component; and
   a plurality of row units, each of the row units having the at least one component that is adjustable for controlling the seed planting depth, all of the plurality of row units adjustable to a single, common adjustment setting.

2. The seed planter adjustment system of claim 1, wherein the user interface is a mobile device.

3. The seed planter adjustment system of claim 2, wherein the mobile device is one of a phone, laptop, tablet and smart watch.

4. The seed planter adjustment system of claim 2, wherein the user interface is physically connectable with a tractor operatively coupled to the seed planter to establish an electronic connection.

5. The seed planter adjustment system of claim 1, wherein the user interface is in wired communication with the controller.

6. The seed planter adjustment system of claim 1, wherein the user interface is in wireless communication with the controller.

7. The seed planter adjustment system of claim 6, wherein the wireless communication between the user interface and the controller comprises a Bluetooth enabled connection.

8. The seed planter adjustment system of claim 6, wherein the wireless communication comprises a gateway, via a wireless interface, for sending sensed input signals to the user interface and for receiving commands to the controller from the user interface.

9. The seed planter adjustment system of claim 1, wherein the at least one component of the seed planter comprises a downforce actuator.

10. A seed planter adjustment system comprising:
    a seed planter comprising:
       at least one actuator for controlling automated seed planting depth;
       a controller for autonomous control of the at least one actuator; and
       a gateway, via a wireless interface, for sending sensed input signals to a user interface and for receiving commands to the controller, the actuator being operatively adjustable, the gateway bi-directional and remotely controlled by the user interface capable of receiving human input.

11. The seed planter adjustment system of claim 10, wherein the user interface is one of a phone, tablet and smart watch.

12. The seed planter adjustment system of claim 10, wherein the at least one actuator of the seed planter comprises a downforce actuator.

13. A seed planter adjustment system comprising:
a seed planter comprising:
at least one actuator for controlling automated seed planting depth;
a controller for autonomous control of the at least one actuator; and
a gateway, via a wireless interface, for sending sensed input signals to a user interface and for receiving commands to the controller, the actuator being operatively adjustable, the input signals to the controller are generated by at least one of ground speed sensors, global positioning systems, and radars.

14. The seed planter adjustment system of claim 13, wherein the user interface is one of a phone, tablet and smart watch.

15. The seed planter adjustment system of claim 13, wherein the at least one actuator of the seed planter comprises a downforce actuator.

16. A seed planter adjustment system comprising:
a seed planter comprising:
at least one actuator for controlling automated seed planting depth;
a controller for autonomous control of the at least one actuator;
a gateway, via a wireless interface, for sending sensed input signals to a user interface and for receiving commands to the controller, the actuator being operatively adjustable; and
an automation master control that does not rely on user interaction after an initial set-up is complete.

17. The seed planter adjustment system of claim 16, wherein the user interface is one of a phone, tablet and smart watch.

18. The seed planter adjustment system of claim 16, wherein the at least one actuator of the seed planter comprises a downforce actuator.

19. A seed planter adjustment system comprising:
a seed planter comprising:
at least one actuator for controlling automated seed planting depth;
a controller for autonomous control of the at least one actuator;
a gateway, via a wireless interface, for sending sensed input signals to a user interface and for receiving commands to the controller, the actuator being operatively adjustable; and
a plurality of row units, each of the row units having the at least one actuator that is adjustable for controlling the seed planting depth, all of the plurality of row units adjusted to a single, common adjustment setting.

20. The seed planter adjustment system of claim 19, wherein the user interface is one of a phone, tablet and smart watch.

21. The seed planter adjustment system of claim 19, wherein the at least one actuator of the seed planter comprises a downforce actuator.

* * * * *